United States Patent
Miyazawa (10) Patent No.: US 6,338,036 B1
(45) Date of Patent: Jan. 8, 2002

(54) CONFIRMATION NOTIFICATION BY APPARATUS USING AUDIO RECOGNITION AS TO THE ACCEPTABILITY OF AN INPUT SOUND

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/379,358

(22) Filed: Aug. 23, 1999

(30) Foreign Application Priority Data

Sep. 3, 1998 (JP) .......................................... 10-250139

(51) Int. Cl.[7] .......................... G10L 17/00; G10L 21/06; G10L 11/02
(52) U.S. Cl. ...................... 704/246; 704/247; 704/211; 704/205; 704/206; 704/273; 704/270
(58) Field of Search .......................... 434/185; 704/246, 704/270.278, 247, 211, 205–206, 273

(56) References Cited

U.S. PATENT DOCUMENTS 5,842,161 A * 11/1998 Cohrs et al. ................. 704/251

FOREIGN PATENT DOCUMENTS

JP 10-250139 * 3/1998 ........... G10L/11/02

OTHER PUBLICATIONS

Dragon ("Talk>To Plus User's Guide," Dragon Systems, ©1992–93).*
VoiceAssist ("User's Guide," Creative Labs ©1993).*

* cited by examiner

Primary Examiner—Richemond Dorvil
Assistant Examiner—Daniel A. Nolan
(74) Attorney, Agent, or Firm—Oliff & Berridge, PLC (57) ABSTRACT

When a sound which is to be recognized is input to a device, this invention briefly informs the user of whether the sound has been input in an appropriate state. A sound inputting part which outputs a sound to be recognized, spoken by a user as a plurality of words forming one group, as digitized sound data, a sound analysis part which analyzes the sound data and calculates the sound power and characteristic data, a sound division detection/determination part which detects an effective sound division based upon the sound power which has been obtained in the sound analysis part and determines whether the sound to be recognized has been input in an appropriate state, based on the size of the sound power and the time length of the effective sound division, a sound recognition processing part in which the sound to be recognized is recognized and processed, and an information outputting part which outputs information which shows that the recognition object sound is appropriate immediately after the inputting of the sound to be recognized, are provided.

18 Claims, 3 Drawing Sheets

CONFIRMATION NOTIFICATION BY APPARATUS USING AUDIO RECOGNITION AS TO THE ACCEPTABILITY OF AN INPUT SOUND

BACKGROUND OF THE INVENTION

1. Field of Invention

This invention relates to a method of notifying a speaker of whether a sound of the speaker is input in an appropriate state when the sound spoken by the speaker is recognized. The invention also relates to a sound recognition device that uses this method, and to a recording medium on which is recorded a processing program that identifies an input state of sound to be recognized.

2. Description of Related Art

Recently, sound recognition technology has been widely used in various fields. In particular, it has been recently used for children's toys and household electrical appliances which have become daily necessities.

If sound recognition technology is used for a device used by a variety of non-specific users, rather than a specific user, in order to recognize sounds spoken by the users at high reliability, it is important to guide the users in the use of the device, such as how to properly input sound, in an easy-to-understand manner, and thus provide an easy-to-use device.

For example, as one device which uses sound recognition which is targeted for a variety of users, a so-called sound clock has been recently developed. That is, when a button or the like disposed on the clock is pressed, a sound informs the user of a current time.

This sound clock is convenient because it is possible to find out the current time in the dark. For example, when a user wakes up in the middle of the night, he/she can find out the current time while in the dark. Furthermore, those who are blind can take advantage of this device. In addition, it is also possible to apply this type of sound clock to children's toys.

In this type of sound clock, setting a current time and alarm can be performed by sound, in addition to outputting the time by sound. For example, if the current time is 6:30 a.m., the user speaks the necessary words in a determined order, such as "a.m.", "6", and "30" by using a sound clock in a current time setting mode. In addition, on the sound clock side, the sound spoken by the user is recognized, and based upon the recognition result, the time setting process is performed. Setting an alarm time can be performed in the same manner, and the user speaks a desired alarm time in an alarm time setting mode.

While time setting can be performed by this type of operation, the user may have a concern as to whether the sound spoken by himself/herself has been input in an appropriate state (an appropriate state for a recognition process).

In order to solve this problem, there are methods such that a sound can be input while a recognition result for the word is responded per word spoken by a user. For example, in the example of the content spoken by the user described earlier, the user speaks "a.m." and a response such as "a.m." is returned from a device as the recognition result. Next, when the user speaks "6", a response such as "6" is returned from the device. Furthermore, when the user speaks "30", an operation is performed such that a response such as "30" is returned from the device. In addition, in this case, when the sound spoken by the user is inappropriate and the sound is not recognized, an operation can be performed such that a response from the device side is not created, and/or a response such as "please speak again" is performed.

Thus, when the recognition result cannot be responded per word spoken by the user and the sound is not recognized, if an operation is performed such that some response is returned, the user can find out whether the content spoken by himself/herself is not appropriate, and how the sound is recognized, so that the user feels relieved and can easily use the device.

However, as described earlier, if the sound is recognized per word and responded to the user, if one setting operation such as time setting is performed, this time-consuming operation can create problems. Furthermore, if this type of sound recognition technology is applied to a device which requires low cost, such as daily necessities and toys, it is necessary to reduce the cost as much as possible, so there are significant restrictions on processing ability of a CPU and on the memory capacity. Therefore, the CPU needs to bear a large burden on the device side, and operations which use a large amount of memory must be reduced as much as possible.

In order to solve this problem, for example, in the case of the time setting described earlier, instead of recognizing the sound and responding with a recognition result when a user speaks one word, it is conceivable to have the user speak words that form one group, such as "a.m.", "6", and "30", intermittently while leaving a small interval after every word, as the necessary content to set the time, and to perform sound recognition with respect to this spoken content. In this case, because there is no word-for-word response of the recognition result described earlier from the device for each of a plurality of words forming one group, it is possible to shorten the time setting period.

However, in a method in which a relatively long series of sounds forming a plurality of words is input to the device from beginning to end, as described earlier, the user may have a concern as to whether a sound per word spoken by himself/herself has been input in an appropriate state. Therefore, it is becoming necessary to inform the user of whether the sound spoken by the user was input in an appropriate state, without having troublesome processing.

SUMMARY OF THE INVENTION

Therefore, one aspect of this invention is to improve the convenience of a device during a sound inputting operation, and to inform a user whether the sound is appropriately input by performing a simple process when a sound is recognized with respect to a sound spoken by the user.

In order to accomplish this aspect, the method of notifying of an input state of sound to be recognized includes detecting an effective sound division for a sound to be recognized based upon the sound power which is obtained from a sound wave form of a sound to be recognized that is spoken by a speaker, determining whether the sound to be recognized has been input in an appropriate state, depending upon a time length of the effective sound division and magnitude of sound power within the effective sound division, and generating information showing that the sound is appropriate immediately after the completion of inputting of the sound to be recognized when it is determined that the sound is appropriate.

Furthermore, the sound to be recognized, for which it has been determined whether the sound has been input in an appropriate state, may be sound spoken with a plurality of words as one group, and may be spoken having a space, between each sound for each word forming this one group, as divisions for each word.

The information which is generated when the sound to be recognized, for which it is determined whether the sound has been input in an appropriate state, is determined to be appropriate, may be at least one of a sound signal, light, a sound message, and a display on a display screen which is instantly output in the spaces that form divisions for each of the words that form the one group.

The plurality of words may include one group belonging to a first through an nth (n is a positive integer) word group, the order of being spoken being determined from a word which belongs to the first word group to a word which belongs to the nth word group, and a reference which determines the time length of the effective sound division being set for each word group.

Additionally, the sound recognition device may also include a sound inputting device which inputs sound to be recognized spoken by a speaker and outputs the sound as digitized sound data; a sound analysis device which analyzes the sound data which has been output from the sound inputting device per predetermined time interval and calculates sound power and characteristic data per predetermined time interval; a sound division detection/determination device which detects effective sound division for the sound to be recognized, based upon the sound power which has been obtained by the sound analysis device, determines whether the sound to be recognized has been in an appropriate state, based upon the time length of the effective sound division and the magnitude of sound power within the effective sound division, and outputs a signal which shows that the sound is appropriate immediately after the completion of the input of the sound to be recognized when it is determined that the sound is appropriate; and a sound recognition processing device which recognizes and processes the sound to be recognized, based upon the characteristic data which has been obtained by the sound analysis device and the effective sound division for the recognition object sound which has been obtained by the sound division detection/determination device, and an information outputting device which outputs a sound message for a user from the device, and a response from the device for the recognition result, and also outputs information which shows that the sound to be recognized and is appropriate when the signal which shows that the sound to be recognized is appropriate is received from the sound division detection/determination device.

The invention may also include a recording medium on which is recorded a program that notifies of an input state of sound to be recognized, which when sound to be recognized is input from a speaker, may determine whether the sound has been input in an appropriate state, and may notify the speaker of the determination result. The processing program may include a procedure which inputs the sound to be recognized spoken by the speaker and outputs the sound as digitized sound data; a procedure which analyzes the sound data which has been thus obtained per predetermined time interval and calculates the sound power per predetermined time interval; a procedure which detects the effective sound division for the sound to be recognized, based upon the sound power which has been thus obtained, determines whether the sound to be recognized has been input in an appropriate state, based upon the magnitude of sound power within the effective sound division and the time length of the effective sound division, and outputs a signal which shows that the sound is appropriate immediately after the completion of the input of the sound to be recognized when it is determined that the sound is appropriate; and a procedure which outputs information which shows that the sound to be recognized is appropriate when a signal is received which shows that the sound to be recognized is appropriate.

This invention relates to improving the convenience of the device by informing the speaker of whether a sound to be recognized which has been input by the user is input in an appropriate state by performing simple processing. In order to realize this, based upon a time length of an effective sound division in the sound to be recognized spoken by the user and the magnitude of sound power of the effective sound division, it is determined whether the sound to be recognized has been input in an appropriate state. If it is determined that the sound has been appropriately input, information which shows that the sound has been appropriately input is given immediately after the input of the sound to be recognized. By so doing, the user can easily find out whether the sound spoken by himself/herself is input in an appropriate state. When the input operation of the sound is performed, the user will not have a concern as to whether the sound spoken by himself/herself has been input in an appropriate state.

Furthermore, the sound to be recognized, for which it is determined whether the sound has been input in an appropriate state, is a sound of a plurality of words spoken as one group, and is sound spoken having a space, between each sound division for each word forming this one group, as divisions for each word. For example, in the case of a clock in which time setting such as the current time can be performed by sound, a plurality of words such as "a.m.", "o'clock", and "minute" can form as one group, and sound which is intermittently spoken by the user at an interval while leaving spaces between each word of the group as divisions is used.

When a plurality of words is thus considered as a group, in a state in which the sound spoken by the user is one-sidedly input, without the response of the recognition result from the device between each word, the user might have a concern as to whether each word has been input in an appropriate state for recognizing the sound.

In order to solve this problem, when a user speaks a sound as a plurality of words which can be considered as a group, the user feels relieved to find out the status of his/her sound if the device provides an indication between each word. For example, a sound signal may be instantly emitted within the division time of each word (for example, a sound signal such as "beep"), a light may be instantly emitted by a light emitting diode (LED) or the like, a sound message (for example, an extremely short sound message such as "yes"), or in a device provided with a display part such as a liquid crystal display (LCD) or the like, a brief display such as "O.K." on the LCD, are possible. By having this type of brief information instantly generated from the device, after the sound of each word spoken by himself/herself, the user can find out if the sound spoken by himself/herself has been input in an appropriate state. Therefore, the user feels confident with respect to the sound inputting operation.

Furthermore, the plurality of words forming one group belong to a first through an nth (n is a positive integer) word group. The order of the words spoken by the user is determined such that a word which belongs to a first word group is first, and then a word which belongs to a second word group is second. A reference which determines a time length of the effective sound division described earlier is set, based upon the respective word groups. This is because the length of the word (the time length needed for the user to speak) which belongs to the respective word groups may depend upon the word group. Therefore, by setting a reference to determine a time length of the effective sound division for the respective word groups, it is possible to determine a length of an appropriate effective sound division with respect to words which belong to the respective word groups.

In addition, because the sound recognition device of this invention uses the method of notifying a user of an input state of sound to be recognized explained above, the user can easily use the device and it is possible for a user who is not familiar with this type of device to easily use the device.

According to this invention explained above, it is determined whether the sound to be recognized has been input in an appropriate state, based upon the magnitude of sound power within the effective sound division and the time length of the effective sound division in the sound to be recognized spoken by the speaker. When it is determined that the sound is appropriate, information which shows that the sound is appropriate is emitted immediately after the input of the sound to be recognized. By so doing, when the user performs a sound inputting operation to the device, he/she will not have worries as to whether the sound spoken by the user has been input in an appropriate state, and an improvement of the operation when the sound input is performed can be developed.

In particular, this invention can obtain an effect when the sound is a plurality of words spoken as one group, and this type of sound is input. For example, in the case of a clock in which the time setting, such as of a current time, can be set by sound, a plurality of words such as "a.m.", "o'clock", and "minutes" can be considered as one group and the user intermittently speaks the sound while leaving a space between each word as a division. By so doing, when the respective words can be intermittently spoken as one group formed by a plurality of words, after each word is spoken, a sound signal which is instantly emitted from the device side is returned. Therefore, the user can instantly find out whether the sound spoken by himself/herself has been input in an appropriate state, and feels confident with respect to the sound inputting operation.

In addition, as information which shows that the sound spoken by the user has been input in an appropriate state, instant information is simply emitted, so the processing can be less burdensome compared to the direct response of the recognition result after recognizing the respective words, and the processing time can be significantly shortened.

Furthermore, a sound recognition device which uses the method of notifying the user of an input state of sound to be recognized can be conveniently used. Even a user who is not familiar with this type of device can easily use the device, and the processing as a whole can be less burdensome, so a lower cost can be expected for the CPU and memory and the overall price of the device can be reduced.

DETAILED DESCRIPTION OF PREFERRED EMBODIMENTS

The following explains the embodiments of this invention with reference to the figures. Furthermore, in this embodiment, the sound clock described earlier is used as an example of a device which uses a sound recognition technology, and an example of time setting such as "a.m.", "o'clock", and "minute" is explained for this sound clock. Here, setting "6:30 a.m." is considered for a specific example.

It may be appreciated that while a sound clock is shown for exemplary purposes, other devices currently existing or developed in the future, may use the method and apparatus of the invention as described herein.

Figure 1:
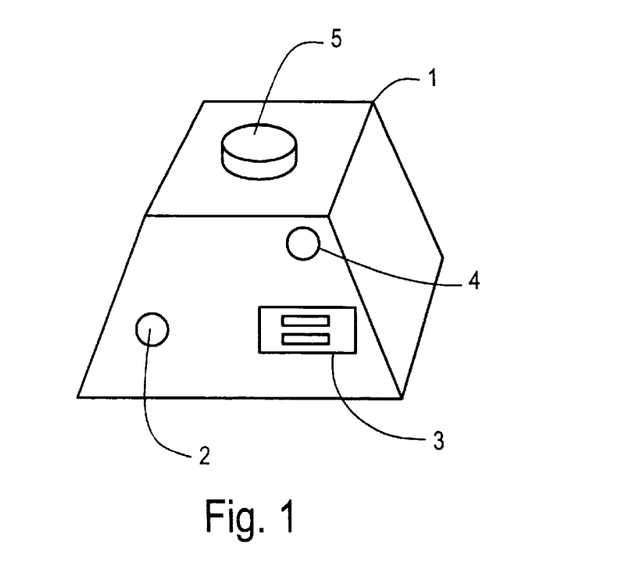
FIG. 1 is a schematic diagram of the external appearance of a sound clock which is used for an embodiment of this invention.

FIG. 1 shows an external structure of a sound clock to which this invention is applied. This sound clock is a sound clock with only a sound message, without a clock display part such as a liquid crystal display part. In a case 1, a speaker 2 is disposed as a sound output means, and a microphone 3 is disposed, into which a sound command from the user can be input. Furthermore, at least a mode setting part 4, which performs mode setting when a current time setting and an alarm setting are performed, and a time button 5 which is pressed when a user would like to find out the current time, and/or the like are provided. In addition, various structural elements can be provided depending upon functions, but drawings of parts which are not directly related to the components of this invention, and the explanation thereof, are omitted here.

In this type of sound clock, as long as the current time is accurately set, when the clock button 5 is pressed by the user, time is output as the current time by a sound message such as "8:30 a.m.".

Figure 2:
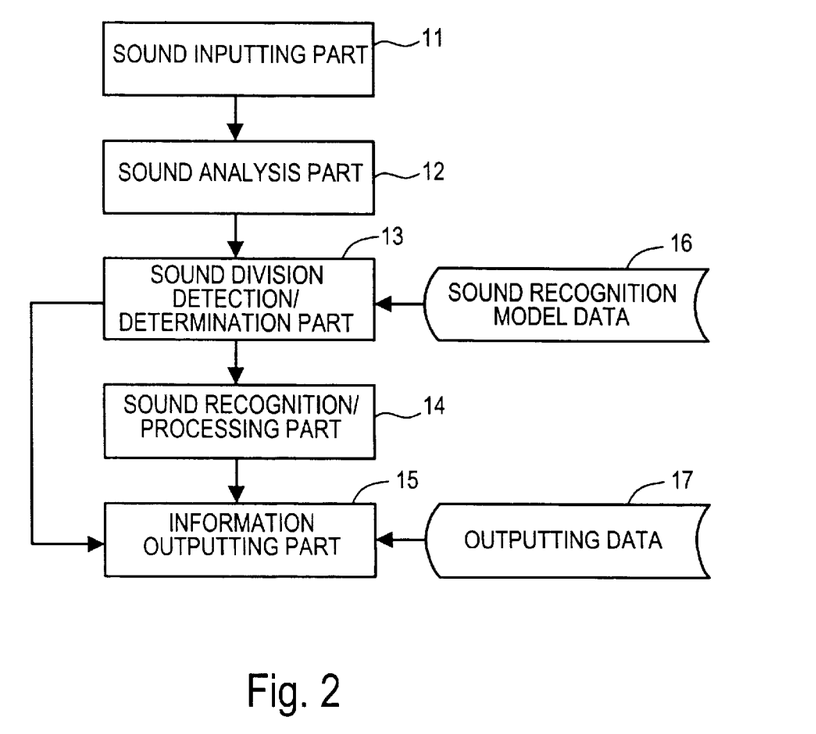
FIG. 2 is a block diagram explaining a schematic structure of a sound recognition device part which is used for the sound clock shown in FIG. 1.

FIG. 2 is a block diagram showing the structure of the sound recognition device which is used for this type of sound clock. A sound inputting part 11, a sound analysis part 12, a sound division detection/determination part 13, a sound recognition processing part 14, an information outputting part 15, sound recognition model data 16 to perform sound recognition, and outputting data 17 to output various information which comes from the device side (a response content corresponding to a recognition result, a sound message content when it is necessary to ask a question to the user, and information which is output when the sound spoken by the speaker is determined to be appropriate), are provided.

The sound inputting part 11 has a microphone 2, described earlier, an amplifier, which is not depicted, and an A/D converter, which is not depicted. Sound spoken by the user is input through the microphone 2, amplified, A/D converted, and output as, for example, 8 KHz and 10 bits of digitized sound data.

In the sound analysis part 12, the sound data which has been output by the sound inputting part 11 is analyzed at short intervals of approximately 20 msec (the shift amount is appropriately 10 msec). The sound power and characteristic data (for example, 10-dimensional LPC cepstrum) can be calculated per short interval time (approximately 20 msec).

By using the sound power which has been calculated in the sound analysis part 12, the sound division detection/determination part 13 detects an effective sound division. When the time length of an effective sound division is within a predetermined, specified time length (L1 and L2 are used and L1<L2) range (within a range shorter than L2 but longer than L1), if it is within a range (within a range <th2, but >th3) of two threshold values (th2 and th3 are used and th2<th3) at which a maximum value of the sound power exists, the effective sound division is determined to be within a normal area and is determined to be input in an appropriate state when the sound is recognized. In addition, if the sound is determined to be appropriate, after a certain time (defined as L4) from the end of the effective sound division, a signal is output which shows that the sound has been input in an appropriate state.

Furthermore, with respect to the effective sound division which is discussed here, a point at which the sound power of the user becomes larger than a certain threshold value (defined as th1) is obtained as the beginning of the sound division. After that, if the sound power becomes smaller than the threshold value th1 and does not become larger than the threshold value th1 again even though predetermined time (defined as L3) has elapsed from the point where the sound power became smaller than the threshold value th1, the point where the sound power became smaller than the threshold value th1 is obtained as the end of the sound division. The period from the beginning to the end of the sound division is called the effective sound division.

Furthermore, the sound recognition processing part 14 performs sound recognition processing by using the sound recognition model data 16, based upon characteristic data within the detected effective sound division (characteristic data within the effective sound division among the sound characteristic data described earlier which has been obtained in the sound analysis part 12).

As described earlier, the information output part 15 outputs a response sound corresponding to the recognition result, and/or a sound message with content which is to be queried of the user, by creating the sound using the outputting data 17. In addition, when a signal is received which shows that the sound which has been output from the sound division detection/determination part 13 is appropriate, the information which shows that the sound has been appropriately input is output (in this embodiment, "beep" is used as a sound signal).

In the sound clock which is thus structured, an example of performing a type of time setting (here, a current time is used) is explained. Here, as described earlier, 6:30 a.m. is used as the time to be set. At this time, a sound clock (called "device") is used in a current time setting mode.

Figure 3A:
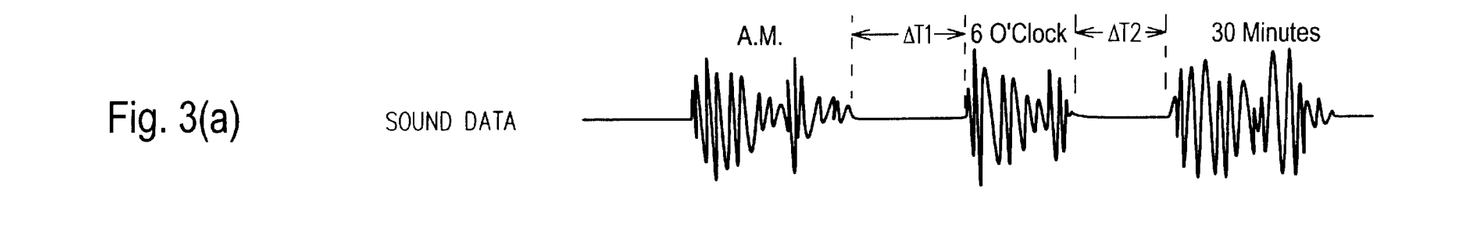
FIGS. 3(a)–3(d) are time charts illustrating the notifying of the input state of sound to be recognized when time setting is performed for the sound clock shown in FIG. 1.

FIG. 3(a) is a sound wave form of "a.m.", "6", and "30" spoken by the user, and this is an output after the sound is A/D converted by the sound inputting part 11. As clarified in FIG. 3(a), when the time is to be set at a certain time, for example, 6:30 a.m., in order to improve the recognition rate, a good result can be obtained if the user is preinstructed such that each word forming a time setting content ("a.m.", "6", "30") is spoken with a small interval between each word (intervals DT1, DT2).

Thus, the sound which is used for this embodiment is a sound of a plurality of words spoken as one group. This is a sound which is intermittently spoken with intervals to divide each word between the respective sounds for the respective words forming this one group.

Furthermore, here the current time setting mode is used. In the case of this type of current time setting mode (this is also applied to the case of the alarm setting mode), the order of the words spoken by the user is determined such that first, "a.m." or "p.m." is spoken, secondly, "o'clock" is spoken, and thirdly, "minute" is spoken. Furthermore, for the convenience of explanation, a part which is spoken first is a word which belongs to a first word group, a part which is spoken second is a word which belongs to a second word group, and a part which is spoken third is a word which belongs to a third word group.

With respect to the sound data shown in FIG. 3(a), sound analysis is performed by the sound analysis part 12. For example, the sound data can be divided into 20 msec frames. Therefore, the sound power and characteristic data can be obtained per frame. Furthermore, the characteristic data is used for the sound recognition processing, and the sound power is used for the determination processing as to whether the sound spoken by the user here is appropriate.

Figure 3B:
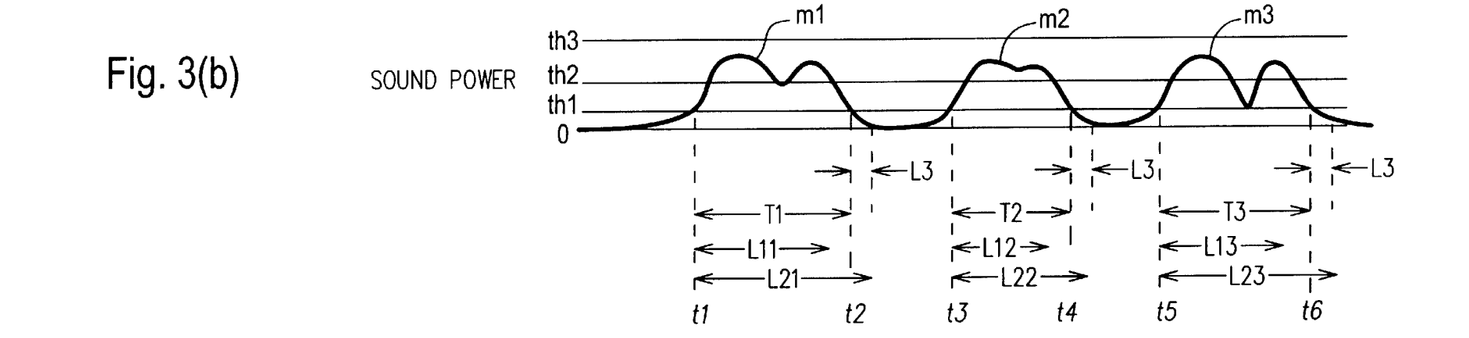

FIG. 3(b) shows a sound power curve which connects the sound power which has been obtained per frame with a curve. Furthermore, in FIG. 3(a), sound data is shown which is obtained when words forming one group are spoken in order, such as "a.m.", "6" and "30". In the processing of this invention, when the user speaks "a.m.", the processing as to whether the content of "a.m." is appropriate is performed, and if it is appropriate, a sound signal such as "beep" is output from the device. After that, as the user speaks "6", the processing as to whether the "6" sound is appropriate is performed, and if it is appropriate, a sound such as "beep" is output from the device. Next, as the user speaks "30", the processing as to whether the "30" sound is appropriate is performed. Thus, with respect to the respective words forming one group, the determination processing as to whether the word has been input in an appropriate state is performed. The following explains details of the processing of the respective words.

The time lengths L1 and L2, which are references to determine the time length of the effective sound division described earlier, are set for the first, the second, and the third word groups, respectively.

In this case, this word group is a determined pattern, such as "a.m.", "o'clock", and "minutes". Therefore, a group of words which are spoken for the "a.m." part is called a first word group, and in this case, the words which belong to this first word group also include "p.m." Furthermore, a group of words which belong to the second word group are words which are spoken to show the hour unit, such as "12 o'clock", "1 o'clock", "2 o'clock" and so forth. Furthermore, a group of words which are spoken for the "minutes" part is a third word group, such as "0 minute", "1 minute", "2 minutes" and so forth. Additionally, among the first through third word groups, the first word group (for example, "a.m.") is spoken first, the second word group (for example, "6 o'clock") is spoken next, and the third word group (for example, "30 minutes") is spoken last. Thus, the order in which words are spoken by the user is predetermined, and according to the order, a recognition process is performed on the device side for the respective word groups which have been input.

Therefore, with respect to L1 and L2 described earlier, a better result can be obtained as they are set for the respective first through third word groups. Hereafter, time lengths which are set for the first word group are L11, L21, (L11<L21), time lengths which are set for the second word group are L12, L22, (L12<L22), and time lengths which are set for the third word group are L13, L23, (L13<L23).

First, when a user speaks "a.m." as a word which belongs to the first word group, as described earlier, sound analysis is performed by the sound analysis part 12 by dividing the sound into 20 msec frames. Then, the sound power and the characteristic data are obtained for each frame.

Furthermore, from the sound power curve which has been obtained for "a.m." which is spoken by the user, the effective sound division T1 of the sound data is obtained for "a.m.".

First, by taking the threshold value th1 which is set in advance as a reference, the time at which the sound power which is obtained as the user speaks the word exceeds the threshold value th1, is taken as the beginning of the sound division of "a.m.". As clarified in this FIG. 3(b), the threshold value th1 is exceeded at time t1, so this time t1 is considered as the beginning of the sound division for "a.m." (beginning t1).

Next, the time at which the sound power for "a.m." becomes smaller than the threshold value th1 is checked, and this time is defined as t2. Then, after a certain time L3, which is set in advance, elapses from this time t2, if the sound power does not exceed the threshold value th1 again, the end of the sound division t1 for "a.m." is defined as time t2. This time t2 is defined as the end of the sound division t1 (end t2).

The division between the beginning t1 and the end t2 which have been thus obtained is defined as the effective sound division T1, t1 is defined as the beginning of the effective sound division T1, and t2 is defined as the end of the effective sound division T1. Furthermore, an extremely short time is set for the certain time L3, and specifically, it is a far shorter time than the times DT1 and DT2 which are the divisions which exist between adjacent words.

Thus, the effective sound division T1 for the sound of "a.m." which belongs to the first word group is obtained. Next, it is determined whether the time length of the effective sound division T1 and the sound power are within the ranges which have been predetermined.

That is, as described earlier, the time length of the effective sound division T1 (the time length itself is also defined as T1) is L11<T1<L21 with respect to the time lengths L11 and L21 which have been set in advance, and when the maximum value m1 of the sound power within the effective sound division T1 satisfies th2<m1<th3 with respect to the threshold values th2 and th3 which have been set in advance, it is determined that the extracted effective sound division T1 is within a normal range, and "a.m." spoken by the user is determined to be input in an appropriate state in terms of the sound recognition.

Figure 3C:
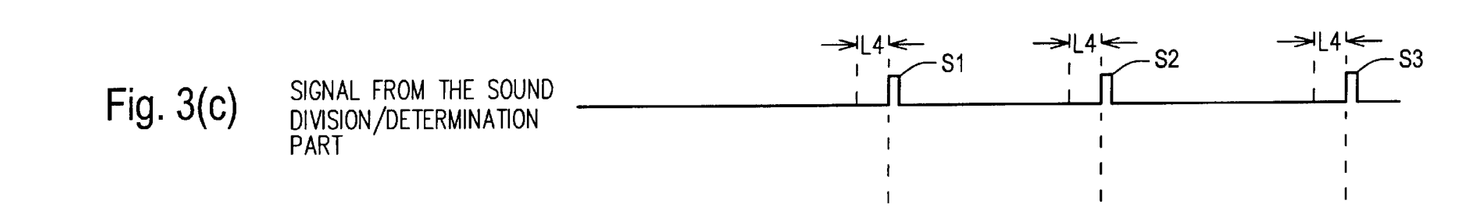

Thus, when it is determined that the effective sound division T1 is within a predetermined range (L11<T1<L21 and th2<m1<th31) with respect to "a.m.", which belongs to the first word group, the sound division detection/determination part 13 outputs a signal s1, which shows that the sound ("a.m." in this case) is a sound which has been input in an appropriate state, to the information outputting part 15 after the time L4 elapses from the end t2 of the effective sound division T1, as shown in FIG. 3(c).

Figure 3D:
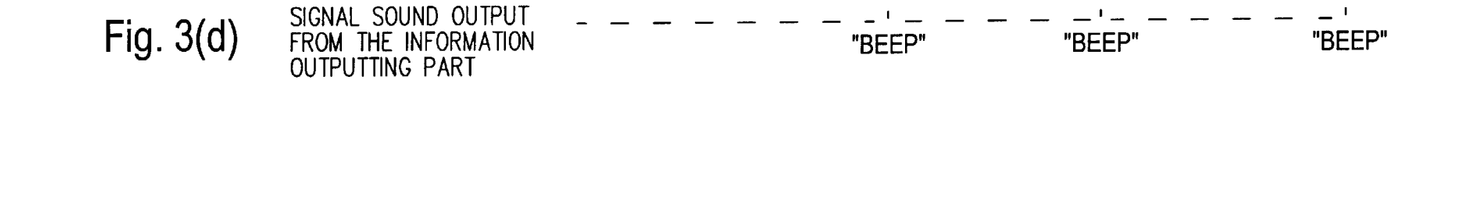

When the information outputting part 15 receives this signal s1, as shown in FIG. 3(d), a sound signal is output as predetermined instant information. This sound signal informs the user that the sound spoken by the user is a sound which has been input in an appropriate state when the sound recognition is performed. Various informative methods can be considered, but in this embodiment, an instant sound signal such as "beep" is output.

That is, when it is determined that the user has spoken "a.m." and it is appropriate, the sound signal such as "beep" is output from the device. By so doing, the user can find out that "a.m." spoken by himself/herself has been input to the device in an appropriate state.

Subsequently, when the user speaks "6 o'clock", which belongs to the second word group, the effective sound division T2 of the sound data for "6 o'clock" is obtained from the sound power curve for the sound data.

First, by taking the threshold value th1 which has been set in advance as a reference, the time at which the sound power which is spoken by the user and exceeds this threshold value th1, is taken as a beginning point of the sound division of "6 o'clock". As clarified from FIG. 3(b), because the threshold value th1 is exceeded at time t3, this time t3 is defined as the beginning of the sound division for "6 o'clock" (beginning t3).

Subsequently, the time at which the sound power for the word such as "6 o'clock" becomes smaller than the threshold value th1 is checked, and this time is defined as t4. Furthermore, if the sound power does not exceed the threshold value th1 again even after a certain time L3, which has been predetermined, elapses from the time t4, the end of the sound division T2 for "6 o'clock" is defined as the time t4. The time t4 is the end of the sound division (end t4).

The division between the beginning t3 and the end t4 which have been thus obtained is defined as an effective sound division T2, t3 is defined as the beginning of the effective sound division T2, and t4 is defined as the end of the effective sound division T2. Next, it is determined whether the time length of the effective sound division T2 is within a predetermined range. In this case, it is determined whether it is L12<T2<L22. Furthermore, it is determined whether the maximum value m2 of the sound power within the sound division T2 is within the range of the threshold values th2 and th3. Furthermore, when these conditions are established, it is determined that the extracted effective sound division T2 is within a normal range and that the sound (6 o'clock in this case) has been appropriately input in terms of the sound recognition process.

When it is thus determined that the effective sound division T2 for "6 o'clock", which belongs to the second word group is within a normal range, the sound division detection/determination part 13 outputs a signal s2, which shows that the effective sound division T2 is within a normal range, to the information outputting part 15, after the time L4 elapses from the end t4 of the effective sound division T2, as shown in FIG. 3(c).

When the information outputting part 15 receives this signal s2, as shown in FIG. 3(d), the information outputting part 15 outputs an instant sound,signal such as "beep", as information which shows that the sound is appropriate, as described earlier.

That is, when the user speaks "6 o'clock" after "a.m." and it is determined that the sound is appropriate, the sound signal such as "beep" is output from the device after "6 o'clock". By so doing, the user can find out that the sound such as "6 o'clock" spoken by himself/herself has been input to the device in an appropriate state.

Subsequently, when the user speaks "30 minutes", which belongs to the third word group, the effective sound division T3 of the sound data is obtained for "30 minutes" from the sound power curve for the sound data.

First, as clarified from FIG. 3(b), because the threshold value th1 is exceeded at the time t5, the time t5 is defined as the beginning of the sound division T3 for "30 minutes" (beginning t5). Furthermore, the time at which the sound power for the word such as "30 minutes" becomes smaller than the threshold value th1 is checked, and time is defined as t6. If the sound power does not exceed the threshold value th1 even after a certain time L3, which has been determined in advance, elapses from the time t6, the end of the sound division for "30 minutes" is defined as the time t6. The time t6 is defined as the end of the sound division (end t6).

The division between the end t6 and the beginning t5 which have been thus obtained is defined as the effective sound division T3, t5 is defined as the beginning of the effective sound division T3, and t6 is defined as the end of the effective sound division T3. Next, it is determined whether the time length of the effective sound division T3 is within a predetermined range. In this case, it is determined whether it is L13<T3<L23. Furthermore, it is determined whether the maximum value m3 of the sound power within the effective sound division T3 is within the threshold values th2 and th3. When these conditions are established, it is determined that the extracted effective sound division T3 is within a normal range and that the sound ("30 minutes" in this case) has been input in an appropriate state.

When it is thus determined that the effective sound division T3 for "30 minutes", which belongs to the third word group, is within a normal range the sound division detection/determination part 13 outputs a signal s3, which shows that the effective sound division T3 is within a normal range, to the information outputting part 15 after the time L4 elapses from the end t6 of the effective sound division T3, as shown in FIG. 3(c).

When the information outputting part 15 receives this signal s3, as described earlier, the information outputting part 15 outputs an instant sound signal, such as "beep", as information which shows that the sound is appropriate.

That is, when the user speaks "30 minutes" after "a.m." and "6 o'clock", if it is determined that the sound has been input in an appropriate state, the sound signal such as "beep" is output from the device after "30 minutes". By so doing, the user can determine that "30 minutes" spoken by himself/herself has been input to the device in an appropriate state.

Thus, when the user speaks "a.m.", "6 o'clock", and "30 minutes", when it is determined that the sounds for the respective words have been input in an appropriate state, "beep" is output from the device after the sounds are spoken by the user, such as "a.m.", "beep", "6 o'clock", "beep", "30 minutes", "beep", so the user feels relieved because he/she can find out that the sounds spoken by himself/herself have been input in an appropriate state.

Furthermore, L3 described earlier was explained as a time which is common to the first through the third word groups, but it is also acceptable to set an appropriate time for each respective word group in the same manner as L1 and L2.

Figure 4A:
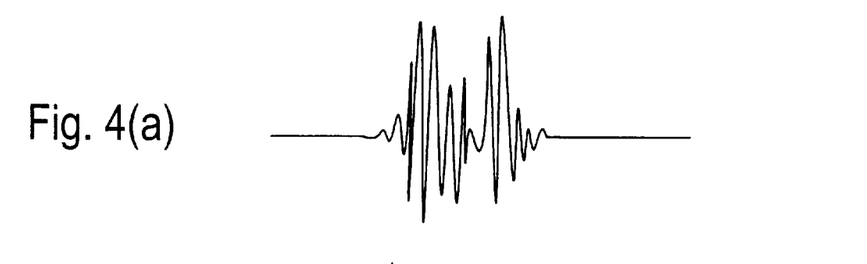
FIG. 4(a)–4(d) are diagrams illustrating an example in which the input sound is not appropriate in an embodiment of this invention.

In addition, as an example in which an effective sound division (effective sound division T1) does not satisfy the above-mentioned conditions, FIGS. 4(a) and (b) can be listed. In FIG. 4(a), two maximum values m1 of the effective sound division T1 exceed the threshold value th3, and the time length of the effective sound division T1 is shorter than L11. In addition, in FIG. 4(b), the maximum value m1 of the effective sound division T1 is smaller than the threshold value th2, and the time length of the effective sound division T1 is longer than L21.

FIG. 4(a) is an example in which the sound spoken by the user is too strong and too fast. Because there is a high possibility such that appropriate sound recognition cannot be performed for the sound spoken by the user in such a state, it is determined that the input sound is not appropriate.

Figure 4B:
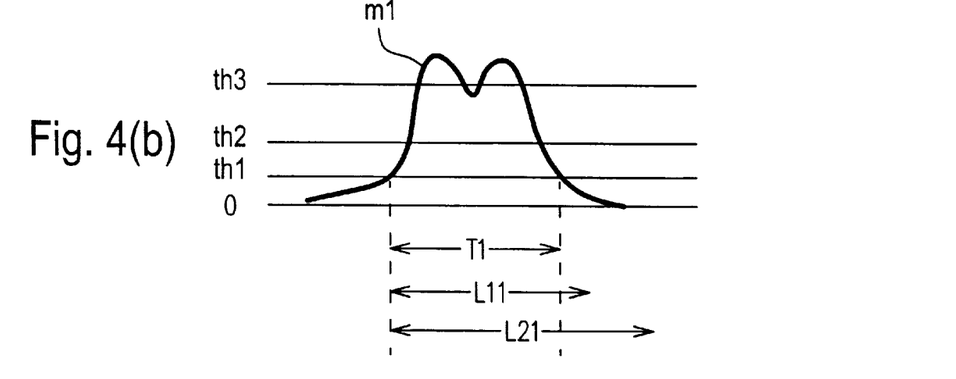
Figure 4C:
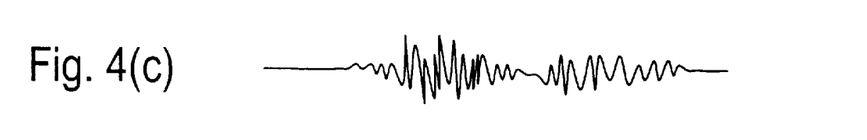
Figure 4D:
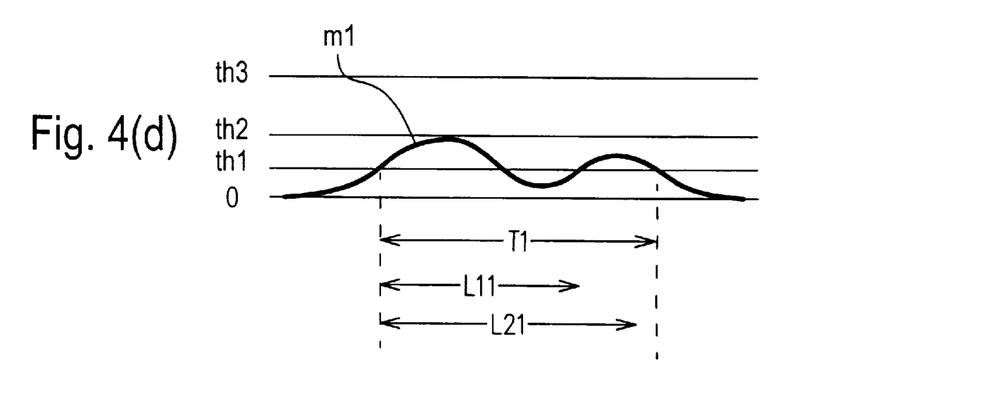

Furthermore, FIG. 4(b) is an example in which the sound spoken by the user is too small, in a state where the sound is extremely drawn out. With respect to the sound spoken by the user in this state, because there is a high possibility such that an appropriate sound recognition cannot be performed, it is determined that the input sound is not appropriate.

Furthermore, FIGS. 4(a) and 4(b) are examples in which both the sound power and the time length of the effective sound division cannot satisfy the conditions. Even when only one of the sound power and the time length of the effective sound division cannot satisfy the conditions, it is determined that the input sound is not appropriate.

When it is thus determined that the sound spoken by the user has not been input in an appropriate state, a sound signal such as "beep" is not emitted. By so doing, the user can find out that the sound spoken by himself/herself is not appropriate. In this case, because the response from the device side is no sound, the user can input the sound again. Or, when the sound has not been input in an appropriate state, it is also possible to inform the user of the state by a sound message and/or other signal(s) which encourage the user to input the sound again.

As explained above, this embodiment shows an example where sound input is performed by words intermittently spoken by the user such that a content formed of a plurality of words such as "a.m.", "6 o'clock", and "30 minutes" can be input to the device at a small interval, the input sound is recognized, and a corresponding operation (a current time setting or the like) can be performed.

In this case, when the user first speaks "a.m.", based upon the sound power and the time length of the effective sound division which have been obtained from the sound data, it is determined whether the sound has been input in an appropriate state. When it is determined that it is an appropriate sound, an instant sound signal such as "beep", which shows that the sound is appropriate, can be emitted. By so doing, the user can find out whether the sound spoken by himself/herself has been input in a normal state by a sound signal from the device, and the sound inputting operation can be performed without worry.

Thus, this invention is particularly effective when a plurality of words which exist in one group continue to be intermittently input, without using a method to input a sound in a dialog format between the speaker and the device.

Furthermore, this invention is not limited to the embodiments explained above and can be modified in various ways within the scope of the invention, provided the main features are not changed.

For example, in the embodiment described earlier, as one of the determination conditions as to whether the effective sound division is appropriate, the maximum value of the sound power is used, but it is also acceptable to determine whether the effective sound division is appropriate by using the average value of the sound power within the effective sound division.

In addition, in the embodiment described earlier, a sound signal such as "beep" is used as information which shows that the sound spoken by the user is appropriate, but it is not limited to this type of sound signal. For example, turning on a light, such as light emitting diode, is also acceptable. Furthermore, a short sound response, such as "yes", is also acceptable. In addition, if there is a display part such as a liquid crystal display, if the sound is appropriate, it is also acceptable to display, for example, "O.K." on the display part immediately after the sound input of the speaker.

Furthermore, in the embodiment described earlier, an example is explained in which the time is set in a clock which uses sound recognition technology, but needless to say, this invention is also applied to devices other than a clock.

Also in the embodiment described earlier, the example of inputting three words as one group is shown, but needless to say, the number of words comprising one group should not be limited to three.

Additionally, a processing program which performs the process of notifying of an input state of sound to be recognized of this invention explained above can be recorded to a recording medium such as a floppy disk, an optical disk, or a hard disk. This invention also includes the recording medium. Furthermore, it is also acceptable to obtain the processing program from a network.

What is claimed is:

1. A method of notifying a speaker of an input state of sound input for recognition, comprising:

detecting an effective sound division for sound input for recognition based upon a sound power which is obtained from a sound wave form of the sound input for recognition as spoken by the speaker;

determining whether the sound input for recognition has been input in an appropriate state, depending upon a time length of the effective sound division and magnitude of sound power within the effective sound division; and generating information when it is determined that the input sound is appropriate, indicating that the input sound is appropriate immediately after the sound is input.

2. The method of notifying a speaker of an input state of sound input for recognition as set forth in claim 1, wherein the sound input for recognition, for which it has been determined whether the sound has been input in an appropriate state, is sound spoken with a plurality of words as one group and having a space between each sound for each word forming this one group, as divisions for each word.

3. The method of notifying a speaker of an input state of sound input for recognition as set forth in claim 2, wherein the plurality of words comprising the one group belong to a first through an nth word group, where n is a positive integer, the order of being spoken being determined from a word which belongs to the first word group to a word which belongs to the nth word group, and a reference which determines the time length of an effective sound division being set for each word group.

4. The method of notifying a speaker of an input state of sound input for recognition as set forth in claim 2, wherein the information generated in the generating step includes at least one of a sound signal, a light, a sound message, and a display on a display screen.

5. The method of notifying a speaker of an input state of sound input for recognition as set forth in claim 4, wherein the information generated in the generating step is instantly output in the spaces that form divisions for each of the words that form the one group.

6. The method of notifying a speaker of an input state of sound input for recognition as set forth in claim 5, wherein the plurality of words comprising the one group belong to a first through an nth word group, where n is a positive integer, the order of being spoken being determined from a word which belongs to the first word group to a word which belongs to the nth word group, and a reference which determines the time length of an effective sound division being set for each word group.

7. A sound recognition device, comprising:

a sound input device that inputs sound for recognition as spoken by a speaker and outputs the spoken sound as digitized sound data;

a sound analysis device that analyzes the sound data which has been output from the sound inputting device per a predetermined time interval and calculates a sound power and characteristic data per the predetermined time interval;

a sound division detection/determination device that detects an effective sound division for the sound input for recognition, based upon the sound power which has been calculated by the sound analysis device, determines whether the sound input for recognition has been input in an appropriate state, based upon the time length of the effective sound division and the magnitude of sound power within the effective sound division, and if the sound is appropriate, outputs a signal that indicates that the sound is appropriate immediately after the sound is input;

a sound recognition processing device that recognizes and processes the sound input for recognition, based upon the characteristic data which has been calculated by the sound analysis device and the effective sound division for the input sound which has been detected by the sound division detection/determination device; and an information outputting device that outputs sound messages, including a response based on the sound recognition result, and information that indicates that the sound input for recognition is appropriate upon receiving the signal which indicates that the sound input for recognition is appropriate from the sound division detection/determination device.

8. The sound recognition device as set forth in claim 7, wherein the sound input for recognition, for which it has been determined whether the sound has been input in an appropriate state, is sound spoken with a plurality of words as one group and having a space between each sound for each word forming this one group, as divisions for each word.

9. The sound recognition device as set forth in claim 8, wherein the plurality of words comprising the one group belong to a first through an nth word group, where n is a positive integer, the order of being spoken being determined from a word which belongs to the first word group to a word which belongs to the nth word group, and a reference which determines the time length of an effective sound division being set for each word group.

10. The sound recognition device as set forth in claim 8, wherein the information output by the information outputting device includes at least one of a sound signal, a light, a sound message, and a display on a display screen.

11. The sound recognition device as set forth in claim 10, wherein the information output by the information outputting device is instantly output in the spaces that form divisions for each of the words that form the one group.

12. The sound recognition device as set forth in claim 11, wherein the plurality of words comprising the one group belong to a first through an nth word group, where n is a positive integer, the order of being spoken being determined from a word which belongs to the first word group to a word which belongs to the nth word group, and a reference which determines the time length of an effective sound division being set for each word group.

13. A recording medium on which is recorded a program that notifies a speaker of an input state of sound input for recognition that, when sound is input from a speaker, determines whether the sound has been input in an appropriate state and notifies the speaker of the determination result, wherein the processing program includes:

a procedure that inputs the sound for recognition as spoken by the speaker and outputs the sound as digitized sound data;

a procedure that analyzes the digitized sound data per a predetermined time interval and calculates the sound power per the predetermined time interval;

a procedure that detects an effective sound division for the sound input for recognition, based upon the sound power, determines whether the sound input for recognition has been input in an appropriate state, based upon the magnitude of sound power within the effective sound division and the time length of the effective sound division, and when it is determined that the sound is appropriate, outputs a signal that indicates that the sound is appropriate immediately after the sound is input; and a procedure that when the signal is received that the input sound is appropriate, outputs information that indicates that the input sound is appropriate.

14. The recording medium on which is recorded a program that notifies a speaker of an input state of sound input for recognition as set forth in claim 13, wherein the sound input for recognition, for which it has been determined whether the sound has been input in an appropriate state, is sound spoken with a plurality of words as one group and having a space between each sound for each word forming this one group, as divisions for each word.

15. The recording medium on which is recorded a program that notifies a speaker of an input state of sound input for recognition as set forth in claim 14, wherein the plurality of words comprising the one group belong to a first through an nth word group, where n is a positive integer, the order of being spoken being determined from a word which belongs to the first word group to a word which belongs to the nth word group, and a reference which determines the time length of an effective sound division being set for each word group.

16. The recording medium on which is recorded a program that notifies a speaker of an input state of sound input for recognition as set forth in claim 14, wherein the information output includes at least one of a sound signal, a light, a sound message, and a display on a display screen.

17. The recording medium on which is recorded a program that notifies a speaker of an input state of sound input for recognition as set forth in claim 16, wherein the information output is instantly output in the spaces that form divisions for each of the words that form the one group.

18. The recording medium on which is recorded a program that notifies a speaker of an input state of sound input for recognition as set forth in claim 17, wherein the plurality of words comprising the one group belong to a first through an nth word group, where n is a positive integer, the order of being spoken being determined from a word which belongs to the first word group to a word which belongs to the nth word group, and a reference which determines the time length of an effective sound division being set for each word group.

\* \* \* \* \*